United States Patent Office 3,494,714
Patented Feb. 10, 1970

3,494,714
HYDROCARBON SOLUBLE COLORANTS
Alvin C. Litke, West Seneca, N.Y., assignor to Allied Chemical Corporation, New York, N.Y., a corporation of New York
No Drawing. Filed Mar. 3, 1966, Ser. No. 531,355
Int. Cl. C09b 27/00, 62/74; D06p 1/08
U.S. Cl. 8—6                                                  6 Claims

ABSTRACT OF THE DISCLOSURE

Polyazo colorants which comprise a mixture of disazo dyes derived from at least four different aromatic primary amines are provided which are liquid at a temperature of about 30° C. and are hydrocarbon soluble.

---

This invention relates to novel colorant compositions and to a process for producing the same. It relates more particularly to such colorants which are liquid at or near room temperatures which colorants are soluable in liquid petroleum products, and particularly hydrocarbon fuels, such as gasolines, kerosenes, diesel fuels, and fuel oils, and lubricating oils.

The present methods for incorporating dyes into petroleum products are fraught with difficulties. This results in part from the low solubility of the dyes and in part from the absence of suitable methods for introducing the dye into the liquid to be colored.

In the dye pot method the dye is mixed with a small portion of gasoline which upon mixing is added to the batch to be colored. The disadvantage of this method is that as the result of the low solubility of the dye, it tends to cake and form a sludge that settles to the bottom of the fuel tank.

Another method is to mix the dye with a suitable solvent having higher solvent properties than the hydrocarbon fuel or other product (for example, benzene or xylene) and, then mix it with the liquid to be colored. However, the relative insolubility of the known dyes having the desired color characteristics prevent the preparation of concetrated stock solutions. Thus, the cost of the solvents used to prepare the stock solutions usually exceeds the cost of the dye.

It is noted that most dyes do not have a solubility in xylene that exceeds 5%. However, by using the dyes disclosed in the present application and the proposed method in U.S. application of A. Litke, Ser. No. 478,465, stock solutions having a concentration of 40% of the dye can be prepared. Futhermore, these stock solutions are stable and remain liquid to −40° C.

An object of the present invention is to provide red coloring dyes which form higher concentrated colorant compositions than is possible by using the presently known dyes.

Another object of the present invention is to provide red coloring dyes for gasoline which form stable concentrated colorant compositions having a concentration as high as 40% of the said dyes in a form readily adapted for dissolution and distribution through a large volume of liquid hydrocarbon solvents.

Another object of this invention is to provide novel colorants of the diazo type which on admixture with an alkl phenol having eight or more carbon atoms in the alkyl chain, produce colorant concentrates which are fluid at room temperatures and which retain their fluid characteristics and do not separate out at temperatures as low as −40 C.

A further object of this invention is to provide novel colorants which dye liquid petroleum produces a clear red color.

The invention provides a mixture of new polyazo colorants of the general structure:

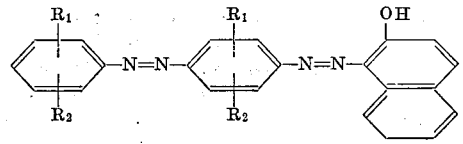

wherein $R_1$ and $R_2$ may be hydrogen, lower alkyl or lower alkoxy, preferably methyl, ethyl, methoxy or ethoxy, provided that at least one of $R_1$ and $R_2$ is other than hydrogen. For the purposes of this application "lower alkyl" includes the alkyl groups from methyl to pentyl and "lower alkoxy" includes the groups from methoxy to pentoxy inclusive. The disazo colorants can be obtained by diazotizing at low temperature, generally about 0–20° C. a mixture of at least four different aromatic amines of the structure

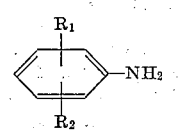

wherein $R_1$ and $R_2$ are as designated above, in approximately equivalent amounts, such that less than one half and preferably approximately one third of all the available amino groups in said mixture of aromatic amines is converted into diazonium groups thereby producing a mixture of diazoamino intermediates. The temperature of the resulting mixture is then permitted to increase such that the diazoamino groups present in said mixture of diazoimino intermediates rearrange and couple into the aromatic nuclei of the undiazotized aromatic amine components of the mixture thereby producing an intermediate of the structure

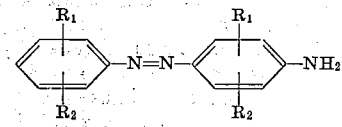

wherein $R_1$ and $R_2$ are as defined above. Finally, the intermediate is diazotized completely and coupled into beta-naphthol to produce a red colorant composition of the present invention.

The colorant compositions of this invention are low melting and produce in combination with an alkyl phenol having 8 or more carbon atoms in the alkyl chain, compositions which form concentrated solutions in aromatic hydrocarbons, that is solutions containing in excess of 40 percent by weight of colorant, which solutions are fluid at ordinary temperatures and which retain their fluidity under extreme temperatures for example at temperatures as low as −40° F. Such concentrates are valuable for coloring petroleum hydrocarbons, especially where the colorant and the hydrocarbon are to be blended at low temperature.

The ability of the colorants of this invention to form with the above-mentioned alkylphenols, compositions which yield aromatic hydrocarbon-colorant concentrates of unexpected flowability characteristics under extreme temperature conditions is surprising in view of the observed behavior of other colorants closely related in structure to the azo composition of this invention. For example, a colorant prepared from a mixture of only two or three amines of the type disclosed above is of markedly reduced tinctorial strength when compared to a product derived from a mixture of four aromatic imines of the type disclosed above. In addition, such a composition derived from a mixture of two or three amines of the type disclosed above, produces in combination with an alkyl phenol a composition which on admixture with an aromatic hydrocarbon such as xylene yields a solution which while fluid at or near room temperature for long periods of time will nevertheless solidify rapidly on cooling below 0° C. and does not revert to its original fluid form by simple warming to about 25° C.

In a preferred method of preparing a colorant concentrate of the present invention, a mixture of nearly equivalent amounts of o-phenetidine, o-toluidine, o-anisidine and synthetic xylidine, the latter being a commercial produce comprising about 7–13 weight percent 3-amino-o-xylidine, 6–12 weight percent 4-amino-o-xylidine, 6–10 weight percent 2-amino-m-xylidine, 30–40 weight percent 4-amino-m-xylidine and 13–20 weight percent 2-amino-p-xylidine with minor amounts of o-amino and p-amino ethylbenzenes, is diazotized at about 0–20° C., with an amount of nitrous acid such that only about one-third of the total amino groups present in the mixture are diazatized. The diazonium mixture is then heated at about 40° C. to effect coupling of the diazonium intermediates into the nuclei of the aromatic amine components of the mixture. The resulting aminaozo mixture is then completely diazotized and coupled into beta-naphthol to produce a red oil soluble colorant which is tacky at about 25° C. and which melts on warming to about 30° C.

In the production of liquid hydrocarbon colorant concentrates the above-mentioned red colorant is heated with nearly its own weight of alkyl phenol and the resulting mixture is diluted with an amount of an aromatic hydrocarbon, such as xylene, depending upon the concentration of colorant desired in the final solution, generally in excess of 30 weight percent.

In the following examples there are described certain perferred embodiments of the invention. It is not intended however, that the invention be limited in any way to the materials or conditions recited in the examples, except as is otherwise indicated in the appended claims.

EXAMPLE 1

A mixture of 40 parts each of o-phentaidine, o-toluidine, synthetic xylidine and o-anisidine is stirred into 58 parts 20° Bé. hydrochloric acid and charged over a period of one-half hour with a solution of 32 parts sodium nitrite in 60 ml. water while the reaction mixture is maintained below 20° C. The mixture is stirred for about 70 hours at room temperature after which it is heated at 40° C. for one hour. The azoamino mixture is stirred overnight with 50 parts activated charcoal in a mixture 700 parts distilled water, 220 parts 20° Bé. hydrochloric acid and 6 parts of an alkylbenzenesulfonate composition known commercially as Nacconol NR and filtered. The filter cake is slurried in 1200 parts distilled water and 116 parts 20° Bé. hydrochloric acid and diazotized at 10° C. with a solution of 35 parts sodium nitrite in 100 parts water for about 2-3 hours after which the diazonium solution is separated from the charcoal by sludge filtration.

A solution is prepared by stirring 65 parts beta-naphthol into 75 parts 50° Bé. caustic soda and 400 parts distilled water.

The diazonium solution and the beta-naphthol solution are added simultaneously to a solution of 45 parts soda ash in 200 parts water while the temperature of the reaction mixture is maintained at about 10° C. at such a rate that a slight excess of beta-naphthol is always present in the reaction mixture which is kept alkaline by intermittent addition of soda ash. The coupled mixture is stirred for about 70 hours to complete the reaction after which the colorant, 161 parts, is recovered in the form of a mass which is tacky at about 25° C. and which melts on warming to about 30° C.

EXAMPLE 2

A mixture of 40 parts of the dye prepared in Example 1 and 35 parts nonylphenol is heated several hours on a steam bath after which 25 parts xylene is added and the mixture is further heated for a few hours. On cooling there is obtained a deep red liquid colorant concentrate containing about 40 weight percent colorant, which mixes readily with gasoline coloring the same a clear red color. The concentrate has a pour-point of about −40° C. and remains flowable after storage for several months at −30° C.

EXAMPLE 3

For comparison a mixture of 30 parts o-phenetidine, 65 parts o-toluidine and 65 parts synthetic xylidine is converted to a disazo dyestuff with beta-naphthol, as described in Example 1, to produce a red colorant. The colorant is converted into a concentrate containing 40 percent colorant by heating with nonylphenol and xylene, as described in Example 2. The concentrate has an appreciably bluer shade than the concentrate of Example 2. In addition the concentrate has a strength only 80 percent that of the concentrate of Example 2 and the viscosity thereof increases on storage at room temperature.

I claim:
1. A red polyazo colorant which comprises a mixture of disazo dyes each of which corresponds to the general formula:

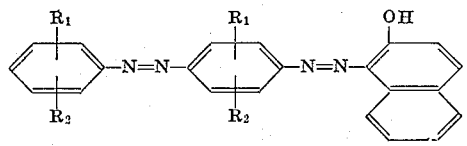

wherein:
each of $R_1$ and $R_2$ is selected from the group consisting of hydrogen, lower alkyl and lower alkoxy,
at least one of $R_1$ and $R_2$ being other than hydrogen, said colorant being liquid at a temperature of about 30° C. and being prepared by a process which comprises (a) diazotizing a mixture of at least four different aromatic amines of the structure

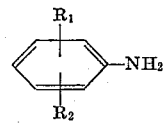

wherein $R_1$ and $R_2$ are as defined above, in approximately equivalent amounts, such that less than one-half of all the available amino groups in said mixture of aromatic amines is converted into diazonium groups, thereby producing a mixture of diazoamino intermediates, (b) increasing the temperature of the reaction mixture produced in step (a), thereby producing an intermediate mixture of aminoazo compounds of the structure

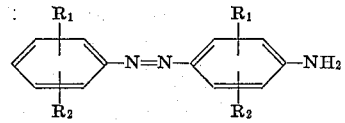

wherein $R_1$ and $R_2$ are as defined above, and (c) diazotizing completely the intermediate mixture of aminoazo compounds of step (b) and coupling the completely diazotized product into beta-naphthol.

2. A red polyazo colorant as claimed in claim 1 wherein:
each of $R_1$ and $R_2$ is selected from the group consisting of hydrogen, methyl, ethyl, methoxy, and ethoxy,
at least one of $R_1$ and $R_2$ being other than hydrogen, and said colorant is petroleum hydrocarbon soluble.

3. A red polyazo colorant as claimed in claim 1 wherein:
$R_1$ and $R_2$ are selected from the group consisting of hydrogen, methyl, ethyl, methoxy and ethoxy, and said amine mixture consists essentially of o-toluidine, o-anisidine, o-phenetidine, and synthetic xylidine.

4. A red polyazo colorant as defined in claim 1 prepared by a process which comprises:

(a) diazotizing, at a temperature below 20° C., said mixture of amines with an amount of nitrous acid such that approximately one-third of all the available amino groups in said mixture of aromatic amines is converted into diazonium groups, thereby producing a mixture of diazoamino intermediates, (b) heating the mixture of diazoamino intermediates produced in step (a) to a temperature of about 40° C. to effect coupling of the diazonium intermediates into the nuclei of the aromatic amine components of the mixture, thereby producing an intermediate mixture of aminoazo compounds of the structure

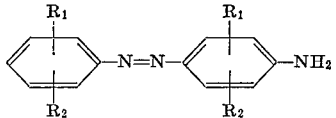

wherein $R_1$ and $R_2$ are as defined above, and (c) diazotizing completely the intermediate mixture of aminoazo compounds of step (b) and coupling the completely diazotized product into beta-naphthol.

5. A colorant as defined in claim 4 wherein said mixture of amines consists essentially of o-toluidine, o-anisidine, o-phentidine and synthetic xylidine.

6. A colorant as defined in claim 5 wherein said synthetic xylidine consists essentially of about 7–13 weight percent 3-amino-o-xylidine, 6–12 weight percent 4-amino-o-xylidine, 6–10 weight percent 2-amino-m-xylidine, 30–40 weight percent 4-amino-m-xylidine and 13–20 weight percent 2-amino-p-xylidine with minor amounts of o-amino and p-amino ethylbenzenes.

References Cited

UNITED STATES PATENTS

| | | | |
|---|---|---|---|
| 1,656,233 | 1/1928 | Penny | 8—6 |
| 1,914,549 | 6/1933 | Woodward | 8—6 |
| 2,087,282 | 7/1937 | Friedrich et al. | 8—6 |
| 3,056,642 | 10/1962 | Kesler et al. | 260—191 |

NORMAN G. TORCHIN, Primary Examiner

J. E. CALLAGHAN, Assistant Examiner

U.S. Cl. X.R.

8—26; 260—191

PO-1050
(5/69)

UNITED STATES PATENT OFFICE
CERTIFICATE OF CORRECTION

Patent No. 3,494,714　　　　　　　　　　Dated　　February 10, 1970

Inventor(s) Alvin C. Litke

It is certified that error appears in the above-identified patent and that said Letters Patent are hereby corrected as shown below:

Column 1, line 43, "concetrated" should be --concentrated--.

Column 1, line 65, "alkl" should be --alkyl--.

Column 2, line 68, "imines" should be --amines--.

Column 3, line 10, "produce" should be --product--.

Column 3, line 18, "atized." should be otized.--.

Column 3, line 39, "o-phentaidine," should be --o-phenetidine,--.

Column 6, line 3, "o-phentidine" should be --o-phenetidine--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents